Dec. 27, 1966    H. CLAAS    3,294,133
CONVEYING AND CUTTING AUGER FOR A COMBINE
Filed Feb. 13, 1964
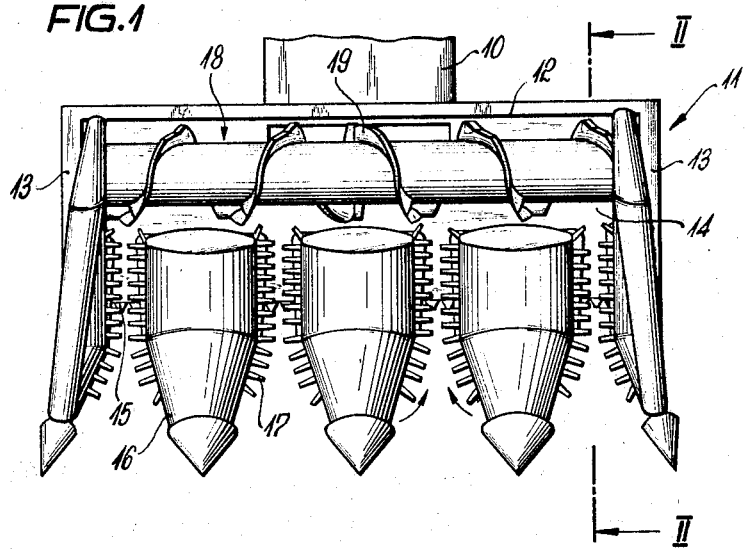
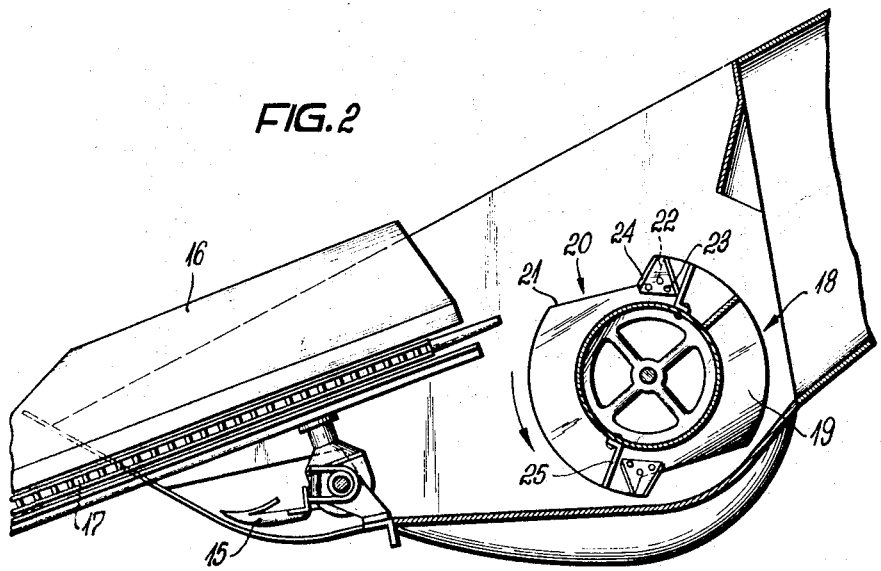
INVENTOR
Helmut Claas
by Michael J. Striker
Atty

United States Patent Office 3,294,133
Patented Dec. 27, 1966

3,294,133
CONVEYING AND CUTTING AUGER
FOR A COMBINE
Helmut Claas, 4 am Kattenpatt, Harsewinkel,
Westphalia, Germany
Filed Feb. 13, 1964, Ser. No. 344,674
Claims priority, application Germany, Feb. 14, 1963,
C 29,158
10 Claims. (Cl. 146—117)

This invention relates to combine harvesters, and more specifically to combine harvesters of the type having conveying means for pushing harvested crop transversely to its direction of passage to a threshing mechanism, such conveying means being formed by a feed auger rotatable about an axis which extends transversely to the direction of passage of the crop and equipped with at least one helical rib extending in a screw line on the peripheral surface of the feed auger, and further having means for cutting the harvested crop which are combined with the conveying means.

In a known combine harvester which can selectively be used for stationary threshing, a feed roller is arranged adjacent the inlet of an elevator and may have a length greater than the width of the threshing mechanism. The end portions of the feed roller are in this case provided with helically extending ribs for pushing the harvested crop together towards the central longitudinal portion of the feed roller. The feed roller is combined with cutting means in the region of the ribs. These cutting means are, however, independent of the transversely conveying helical ribs.

In another known combine harvester a feed auger carrying helically extending ribs at its end portions is arranged to operate above a cutter platform behind the cutting mechanism. The ribs extend substantially to the lateral limits of the elevator connected to the cutter platform. Sectorlike conveying elements located in radial planes are arranged on the end portions of the feed auger and may be provided with recesses in their outer peripheral surfaces to improve the conveying effect. Furthermore, plate members extend in axial planes between the conveying elements associated with both ribs and may be toothed in their outer marginal regions to add to the conveying effect.

It is the object of the present invention to provide a combine harvester of the aforedescribed type which is particularly suitable for harvesting crops having thick stalks, preferably maize or Indian corn, but, if desired, also rape or the like, this combine harvester being adapted to cut the stalks of the crop into pieces after the crop has passed on to the cutter platform, so that it can be efficiently worked subsequently.

This object is achieved according to the invention by providing a combine harvester which includes conveying means adapted to push harvested crop transversely to its direction of passage to a threshing mechanism, said conveying means comprising a feed auger rotatable about an axis which extends transversely to the direction of passage of the crop and at least one helical rib extending in a screw line on the peripheral surface of the feed auger, and further includes means for cutting the harvested crop, said means being combined with said conveying means and comprising recesses in the outer edge of the helical rib and an element limiting at least one side of said recesses and intended for cutting the harvested crop, especially crop having thick stalks, such as maize.

The helical rib may form part of the feed auger. In this construction proposed by the invention the outer edge of the rib does not extend uniformly over its entire length, but is interrupted by the recesses which form ascending or substantially radially extending edges which cut the harvested crop into pieces or at least break it and, moreover, exert a conveying action, i.e. which ensure that the crop collected by the helical ribs in the region of the longitudinal centre of the cutter platform is immediately delivered to the elevator for feeding it to the threshing mechanism. Careful examinations have shown that the recesses proposed by the invention practically do not impair the effect of ther ibs of conveying the crop in the transverse direction.

The invention can be realized in various ways. It is however, always advisable to choose such an arrangement in which the outer cutting end of the element for cutting the harvested crop is located within the circular side projection of the feed auger fitted with the helical rib. Thus, the cutting elements do not project beyond the contour of the circular side projection of the feed auger.

A part of the rib adjacent the recess may serve directly as cutting and conveying element. But, as a rule, it is to be recommended to attach a knife to the rib so as to project into the recess. This ensures a greater freedom in selecting the quality and dimensions of the material for the rib. Also, knives which have been produced separately and attached to the rib can be replaced or reworked, if required after they have become faulty through wear.

Various forms can be chosen for the recesses. It is particularly convenient and simple for production when each recess is defined by two preferably substantially straight boundary lines having unequal lengths and intersecting preferably at an obtuse angle, the recess covering a range of about 45 to 80° in the circumferential direction. In such constructions, expediently the leading boundary line of the recess is longer than the trailing boundary line as seen in the direction of rotation of the feed auger. This ensures that the desired cutting effect is reliably obtained in the region of the trailing boundary line of the recess since this line has a steeper gradient. It is, however, not necessary for this boundary line or edge which forms the cutting edge or is located adjacent the cutting edge of an attached cutting member to extend perpendicular to the peripheral surface of the feed auger. Rather, it is to be recommended to have this boundary line extend obliquely outwardly and rearwardly in relation to the direction of rotation to prevent the crop from being caught and also to obtain a pulling cutting effect within the desired limits.

To compensate for the rib being weakened in some places by the recesses and being subjected to particularly high mechanical stresses due to the desired cutting effect, it is further to be recommended to support the rib at a point adjacent each recess by a lateral supporting arm against the peripheral surface of the feed auger. Such lateral supporting arms practically do not impair the conveying operation performed by the helical rib and even assist in conveying the crop towards the elevator which feeds it to the threshing mechanism. The lateral supporting arms are expediently of triangular construction and may extend with their broadsides substantially in axial planes.

The number of recesses arranged in a rib and the spacing between successive recesses can be freely chosen within wide limits. Especially such a construction has been found to be suitable in which successive recesses are displaced relative to one another by about 180°.

It has already been mentioned that the recesses proposed by the invention and serving in the first place to achieve a cutting or breaking effect also assist in conveying the crop in the main direction of passage. Utilizing this feature, it is especially advantageous for harvesting maize and the like when two helical ribs having recesses forming cutting elements are so mounted on the feed auger as to extend in opposite directions from the ends of the feed auger to the middle of the length thereof, no special longitudinal conveying means being provided in the central longitudinal region of the feed auger.

A preferred embodiment of the invention will now be described by way of example and with reference to the accompanying drawing, in which:

FIG. 1 is a top plan view of a cutter platform of a combine harvester according to the invention, this cutter platform being particularly designed for harvesting maize or Indian corn, and FIG. 2 is a section taken on line II—II of FIG. 1, but on a larger scale.

FIG. 1 shows a cutter platform 11 mounted in a known manner in front of an elevator channel 10 and comprising a rear wall 12, side walls 13 and a bottom 14. Arranged in front of the bottom 14 of the cutter platform 11 is a cutting mechanism 15 over which guide means 16 project forwardly. The guide means 16 are equipped in a known manner with conveyor chains 17 fitted with fingers. Arranged to work above the bottom 14 of the cutter platform 11 is an operatively driven feed auger 18 which is equipped with helical ribs 19 extending in a screw line from the ends to the middle of the feed auger and adapted to push cut crop on the cutter platform 11 together towards the central longitudinal region of the feed auger and into the entrance of the elevator channel 10. The helical ribs 19 are so arranged on the two longitudinal halves of the feed auger 18 as to extend in opposite directions.

As shown especially in FIG. 2, the helical ribs 19 are provided with peripheral recesses 20 arranged at a distance of about 180° apart and each defined by a longer boundary line 21 and a shorter boundary line 22. The two boundary lines 21 and 22 each extend substantially in a straight line and form an obtuse angle between them. A knife 24 secured by rivets 23 or the like projects beyond the boundary line 22 into each of the recesses 20. Behind each knife 24 the helical ribs 19 are supported on the peripheral surface of the feed auger 18 by a lateral supporting arm 25. The supporting arms 25 are of substantially triangular construction and may extend with their broadsides substantially in axial planes.

The crop brought on to the cutter platform 11 is not only fed to the central longitudinal region of the feed auger 18, i.e., towards the entrance of the elevator channel 10, by the oppositely extending helical ribs 19, but is also cut or broken by the knives 24. Moreover, the projections formed by the knives 24 exert a conveying action in the main direction of passage of the crop, i.e., they reliably convey the crop into the entrance of the elevator channel 10. This action is still increased by the lateral supporting arms 25.

As already mentioned, the illustrated embodiment is only an exemplified realization of the invention and the latter is not restricted thereto. Rather, various other embodiments are still possible. Thus, it is not necessary that guide means provided with chains fitted with fingers are arranged in front of the feed auger 18. The number of the guide means 16, if any, or the number of the rows of crop to be simultaneously gripped may be changed. The form of the recesses 20 provided in the helical ribs 19 can be freely selected within a wide range of possibilities. For example, the boundary lines of the recesses 20 need not extend in a straight line. The spacings between successive recesses in the helical ribs 19 may be freely selected. Knives manufactured separately and attached to the helical ribs, such as the knives 24, may be dispensed with. Alternatively, it is also possible to use knives which are shaped and secured differently from the illustrated embodiment.

I claim:

1. A combine harvester including conveying means adapted to push harvested crop transversely to its direction of passage to a threshing mechanism of the harvester, said conveying means comprising a feed auger rotatable about an axis which extends transversely to the direction of passage of the crop and at least one helical rib extending about said auger and outwardly from the peripheral surface thereof, said helical rib being provided with spaced recesses extending from the outer edge of the rib into the same; and cutting means for cutting the harvested crop during conveyance thereof, said cutting means including a knife attached at each recess to said helical rib so as to project into said recess, said knife having a cutting edge extending traversely to the outer edge of said rib and the outer end of each cutting knife being located within the circular side projection of said helical rib.

2. A combine harvester as set forth in claim 1, wherein each cutting knife is attached to a side face of said helical rib.

3. A combine harvester as set forth in claim 1, wherein each recess in said helical rib is defined by two boundary lines of unequal length and the respective cutting knife projecting beyond the shorter one of said boundary lines in said recess.

4. A combine harvester as set forth in claim 3, wherein said boundary lines are substantially straight.

5. A combine harvester as set forth in claim 4, wherein said boundary lines intersect each other at an obtuse angle.

6. A combine harvester as set forth in claim 3, wherein each recess extends through a region of about 45° to 80° in circumferential direction.

7. A combine harvester as set forth in claim 1, and including a lateral supporting arm adjacent each recess in the helical rib and connected to the latter and said feed auger to support the helical rib against the peripheral surface of said auger.

8. A combine harvester as set forth in claim 7, wherein said lateral supporting arm is of substantial triangular construction and extends with its broadsides substantially in an axial plane of said auger.

9. A combine harvester as set forth in claim 1, wherein successive recesses in said helical rib are displaced from each other through an angle of about 180°.

10. A combine harvester as set forth in claim 1, wherein two helical ribs are mounted on said feed auger so as to extend in opposite directions from the ends of the feed auger to the middle of the length thereof.

References Cited by the Examiner

UNITED STATES PATENTS 2,567,472    9/1951    Crandall.
2,841,197    7/1958    Ardrey _____ 146—182

FOREIGN PATENTS 204,832    8/1959    Austria.
923,513    2/1955    Germany.

ANDREW R. JUHASZ, *Primary Examiner.*